(12) United States Patent
Zheng et al.

(10) Patent No.: US 10,262,054 B2
(45) Date of Patent: Apr. 16, 2019

(54) DATABASE AND SERVICE UPGRADE WITHOUT DOWNTIME

(71) Applicant: Microsoft Technology Licensing, LLC, Redmond, WA (US)

(72) Inventors: Zhong Zheng, Beijing (CN); Haibo Lin, Beijing (CN); Silan Wang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 430 days.

(21) Appl. No.: 15/003,542

(22) Filed: Jan. 21, 2016

(65) Prior Publication Data

US 2017/0212947 A1   Jul. 27, 2017

(51) Int. Cl.
  *G06F 17/30* (2006.01)
  *H04L 29/08* (2006.01)
  *G06F 8/656* (2018.01)

(52) U.S. Cl.
  CPC ........ *G06F 17/30595* (2013.01); *G06F 8/656* (2018.02); *G06F 17/30289* (2013.01); *H04L 67/10* (2013.01)

(58) Field of Classification Search
  CPC ................................................ G06F 17/30002
  See application file for complete search history.

(56) References Cited

U.S. PATENT DOCUMENTS

| | | | |
|---|---|---|---|
| 7,155,426 B2 | 12/2006 | Al-Azzawe | |
| 7,310,634 B2 | 12/2007 | Zwiegincew et al. | |
| 7,523,142 B2 | 4/2009 | Driesen et al. | |
| 8,315,972 B2* | 11/2012 | Chkodrov | G06Q 30/06 707/600 |
| 8,326,800 B2 | 12/2012 | Cunningham et al. | |
| 8,417,737 B2 | 4/2013 | Hopmann et al. | |
| 8,521,706 B2 | 8/2013 | Alpern et al. | |

(Continued)

FOREIGN PATENT DOCUMENTS

| | | |
|---|---|---|
| EP | 1091305 | 4/2001 |
| WO | 1999008206 A1 | 2/1999 |

OTHER PUBLICATIONS

International Search Report and the Written Opinion issued in PCT Patent Application No. PCT/US2017/013617 dated Apr. 20, 2017.

(Continued)

*Primary Examiner* — Hung Q Pham

(57) ABSTRACT

The upgrading of a relational database on multiple of machines (e.g., a service) that perform data operations via stored procedures. The upgrade occurs without changing the functionality of the set of one or more stored procedures. Accordingly, even if the machine itself is not upgraded, the machines can still interface with the database via the set of one or more stored procedures. The upgrade of the relational database occurs by adding occur by adding new table(s) to the relational database, and thereafter adding new stored procedures to the stored procedure store, the new stored procedures referencing parameters of the new tables. Since the machines that interface with the relational database can still operate on the upgraded database using the old stored procedures, each machine may then be upgraded in an orderly manner to interface with the new stored procedures.

17 Claims, 7 Drawing Sheets

(56) References Cited

U.S. PATENT DOCUMENTS

| | | |
|---|---|---|
| 2005/0257216 A1 | 11/2005 | Cornell et al. |
| 2011/0016461 A1 | 1/2011 | Bankston et al. |
| 2011/0246419 A1 | 10/2011 | Yancey et al. |
| 2012/0084319 A1 | 4/2012 | Bansode et al. |
| 2012/0101983 A1 | 4/2012 | Hopmann et al. |
| 2014/0143284 A1 | 5/2014 | McCaffrey |
| 2014/0208303 A1 | 7/2014 | Asayag et al. |
| 2015/0007159 A1 | 1/2015 | Gebhard et al. |
| 2015/0161182 A1 | 6/2015 | Baeuerle et al. |
| 2016/0085777 A1* | 3/2016 | Engelko ............ G06F 17/30292 707/803 |

OTHER PUBLICATIONS

"Zero Downtime Database Upgrade Using Oracle GoldenGate", In White Paper of Oracle, Aug. 2015, 19 pages.

* cited by examiner

DATABASE AND SERVICE UPGRADE WITHOUT DOWNTIME

BACKGROUND

Computing systems often organize data into databases, a common type of database called a relational database. In order to simplify the process of performing common sets of data operations on a relational database, such common sets of data operations are organized into a stored procedure. Accordingly, when interfacing with a database, a component can either perform data operations directly on the relational database, but also often has the option of interfacing with the database using one or more stored procedures.

A service is a collection of one or more machines that operate to perform a set of one or more functions for a collection of one or more requestors. Such requestors are often termed "customers" of the service. Customers of the service could be human users (such as when the service is an e-mail service), may be other services or components (such as when the service is a metadata service) or may be a combination thereof (such as when the service is a storage service). In any case, services often relay on an underlying relational database to maintain and track important data that the services uses to provide the set of service functions.

When upgrading the service, there is typically some service downtime. During the service downtime, the relational database is upgraded, and the machines of the service are reconfigured to interact with the upgraded relational database. The service is then made available again. However, during such service downtime, customers often do not have beneficial use of the service.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the upgrading of a relational database on multiple of machines (e.g., a service) that perform data operations via a set of one or more stored procedures. The upgrade occurs without changing the functionality of the set of one or more stored procedures. Accordingly, even if the machines of the service themselves are not upgraded, the machines can still interface with the database via the set of one or more stored procedures. The upgrade of the relational database occurs by adding new table(s) to the relational database, and also adding new stored procedures to the stored procedure store, the new stored procedures referencing parameters of the new tables.

Since the machines that interface with the relational database can still operate on the upgraded database using the old stored procedures, each machine may then be upgraded in an orderly manner to interface with the new stored procedures. Accordingly, there may always be a set of machines (whether not upgraded, or which have completed upgrade) that may interface with the relational database to thereby support the service. For instance, machines that have not yet been upgraded may interface with the database using the old stored procedures. On the other hand, machines that have been upgraded may interface with the database using the new stored procedures.

Thus, the upgrade may be accomplished with little, and likely no, downtime of the service. This may be particularly advantageous for services that are to be highly available, such as those services relied upon as having low latency, or those functions that are absolutely mission critical and urgent.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to the upgrading of a relational database on multiple of machines (e.g., a service) that perform data operations via a set of one or more stored procedures. The upgrade occurs without changing the functionality of the set of one or more stored procedures. Accordingly, even if the machines of the service themselves are not upgraded, the machines can still interface with the database via the set of one or more stored procedures. The upgrade of the relational database occurs by adding new table(s) to the relational database, and also adding new stored procedures to the stored procedure store, the new stored procedures referencing parameters of the new tables.

Since the machines that interface with the relational database can still operate on the upgraded database using the old stored procedures, each machine may then be upgraded in an orderly manner to interface with the new stored procedures. Accordingly, there may always be a set of machines (whether not upgraded, or which have completed upgrade) that may interface with the relational database to thereby support the service. For instance, machines that have not yet been upgraded may interface with the database using the old stored procedures. On the other hand, machines that have been upgraded may interface with the database using the new stored procedures.

Thus, the upgrade may be accomplished with little, and likely no, downtime of the service. This may be particularly advantageous for services that are to be highly available, such as those services relied upon as having low latency, or those functions that are absolutely mission critical and urgent. Some introductory discussion of a computing system will be described with respect to FIG. 1. Then, the upgrade procedures will be described with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
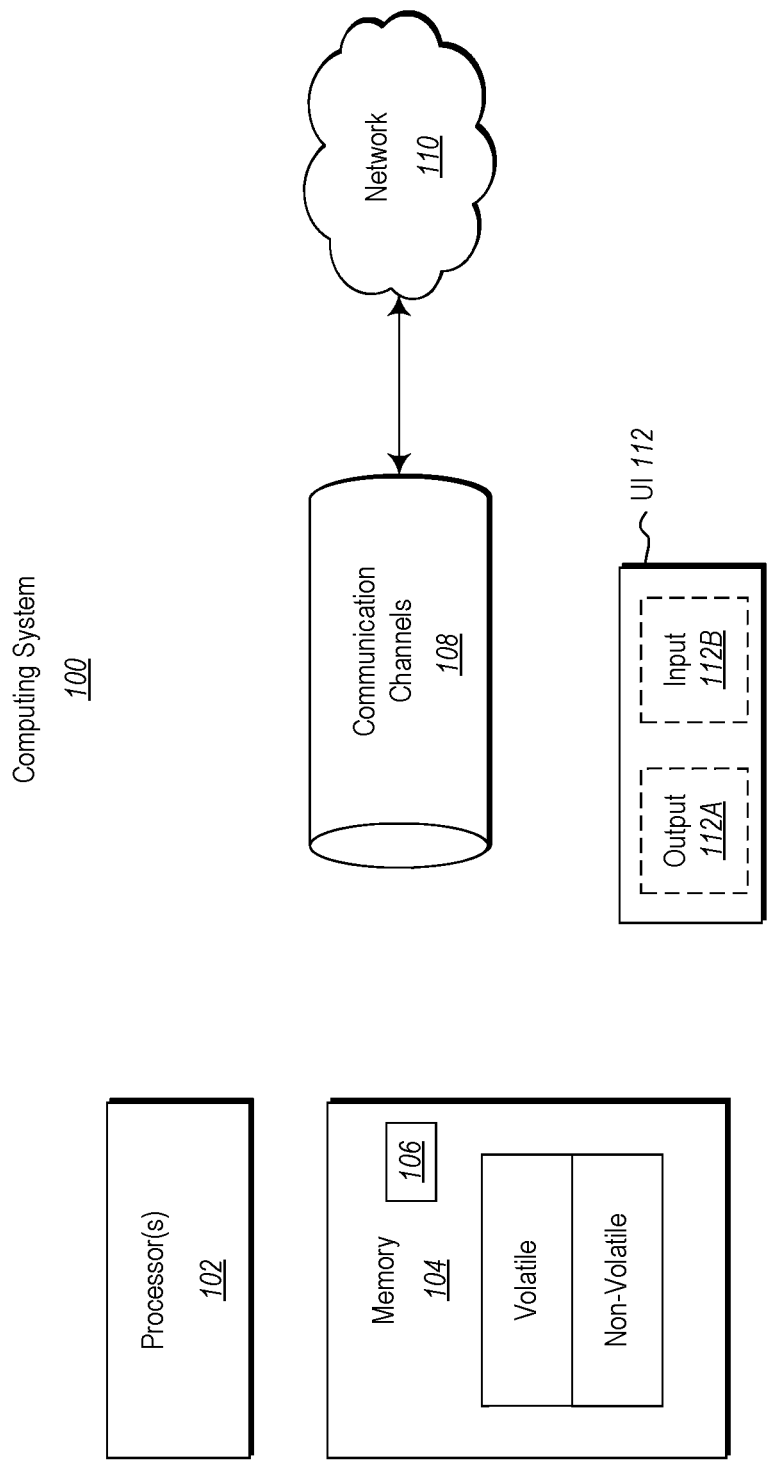
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
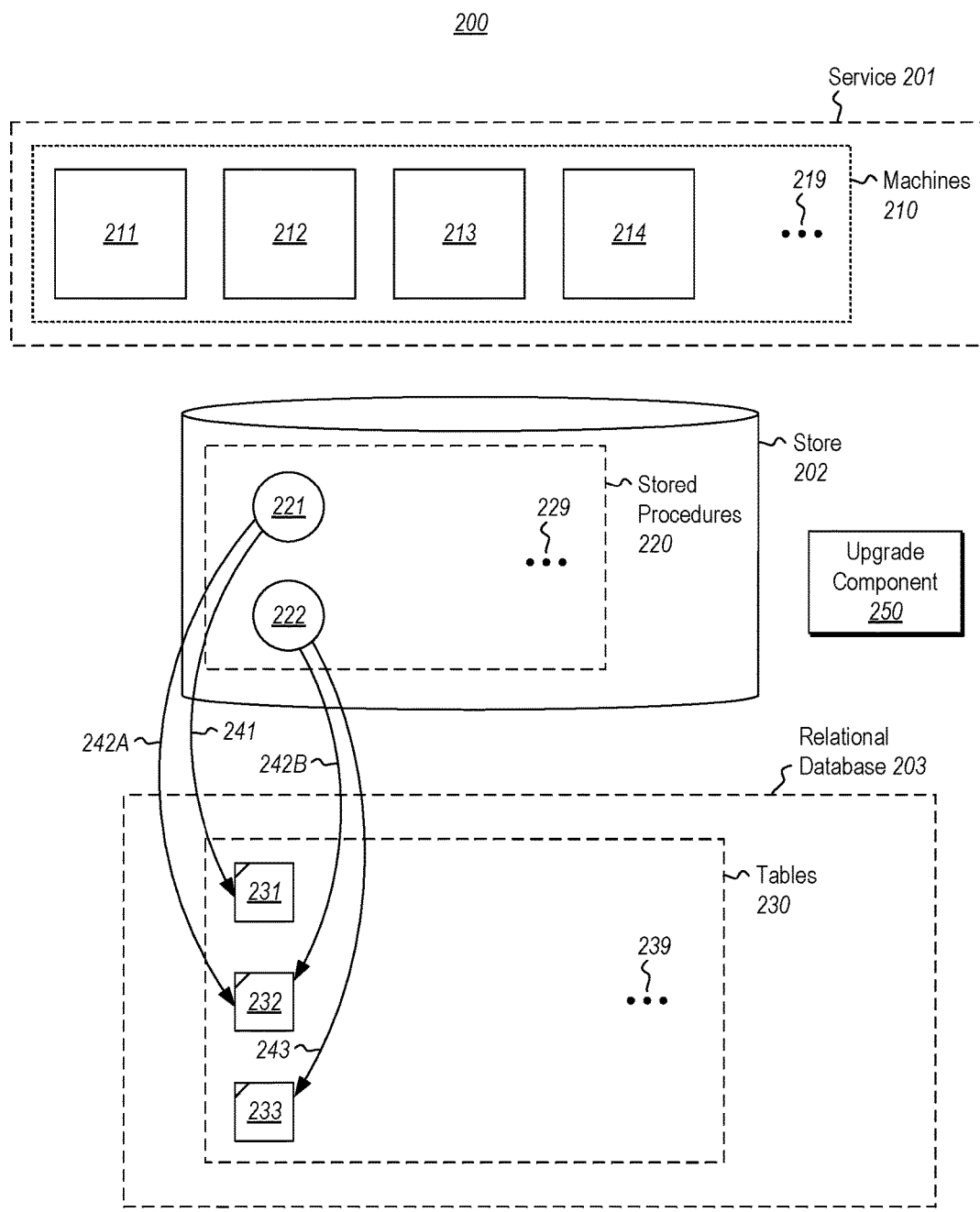
FIG. 2 illustrates an example architecture in which machines of a service perform data operations on tables of a relational database via stored procedures stored in a stored procedures store.

FIG. 2 illustrates an architecture 200 that includes a service 201 that interacts with a relational database 203 via a set of stored procedures 220 that are stored within a stored procedure store 202. The service 201 includes a set 210 of machines. The set 210 of machines is illustrated as including four machines 211 through 214. However, the ellipses 219 represent that the principles described herein are not limited to the particular number of machines that support the service 201. There may even be but a single machine 211 that supports the service. However, there are services that are supported by thousands of machines. The set 210 of machines may include physical machines, in which case the physical machines may take the form of the computing system 100 of FIG. 1. Alternatively or in addition, the set 210 of machines may include virtual machines. In any case, the set 210 of machines operate to support the service 201.

The service 201 is supported by data, at least a portion of which being included within tables 230 of a relational database 203. The relational database 203 is illustrated as including three tables 231, 232 and 233. However, this is by way of example only. A relational database may include any number of tables as represented by ellipses 239.

The service 201 uses the stored procedures 220 stored within a stored procedure store 202 in order to perform data operations on tables 230 within the relational database 203. For instance, the stored procedures includes two stored procedures 221 and 222, though the ellipses 229 represent that there may be any number of stored procedures through which the service 201 operates to perform data operations on the tables 230 of the relational database 202. The stored procedures 220 reference the tables upon which they operate. For instance, stored procedure 221 performs data operations on tables 231 and 232 as represented by arrows 241 and 242A, and thus the stored procedure 221 includes appropriate references to tables 231 and 232. On the other hand, stored procedure 222 performs data operations on tables 232 and 233 as represented by arrows 242B and 243, and thus the stored procedure 222 includes appropriate references to tables 232 and 233.

The architecture 200 also includes a service upgrade component 250 that manages upgrades of the service without service downtime. In other words, the service upgrade component 250 upgrades the service while allowing machines 210 of the service 201 to continue to performing data operations on the relational database 203 using the stored procedures 221 and 222. The service upgrade component 250 does not change the stored procedures 221 and 222. Accordingly, the references to the tables (references 241, 242A, 242B and 243) remain unchanged. Preferably, none of the parameters of the stored procedures 221 and 222 are changed during the upgrade process.

Throughout the upgrade process, the tables 231, 232 and 233 remain unchanged, and the stored procedures 221 and 222 also remain. Accordingly, any of the machines 210 of the service may continue to use the relational database 203 so long as they operate via the stored procedures 221 and 222, thereby ensuring that whatever else is happening to the relational database 203, the tables 231 through 233 remain consistent, thereby ensuring a consistent response from the relational database 201 the same as though no upgrade was happening at all. In some embodiments, any machine 210 of the service always operates via one or more stored procedures 220 when performing operations on the relational database. In that case, the machines 210 act the same as if no upgrade was happening at all since there are no direct queries to the database.

Figure 3:
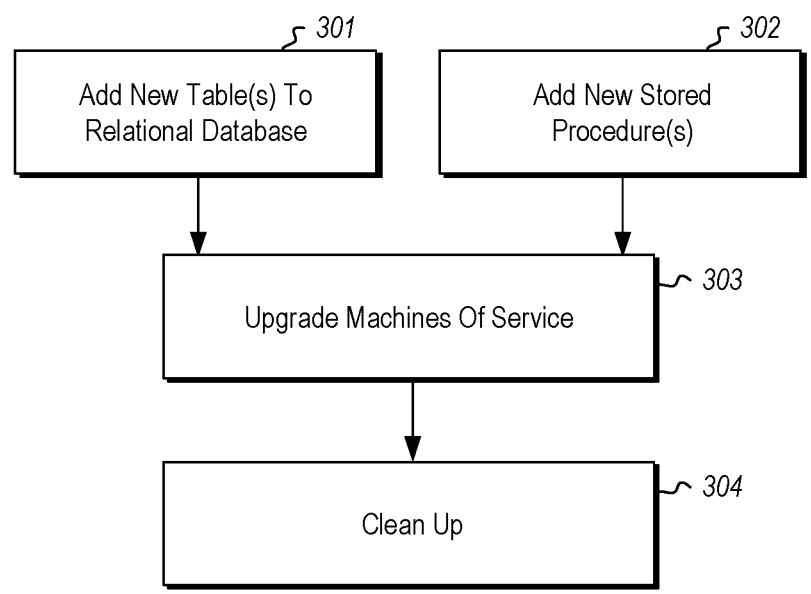
FIG. 3 illustrates a flowchart of a method for upgrading a service in a manner that the service may continue to operate to perform data operations on the relational database during the upgrade.

FIG. 3 illustrates a flowchart of a method 300 for upgrading a service. As the method 300 may be performed within the environment 200 of FIG. 2, the method 300 will now be described with respect to FIG. 2 and subsequent states of FIG. 2 as represented in FIGS. 4A through 4E.

Figure 4A:
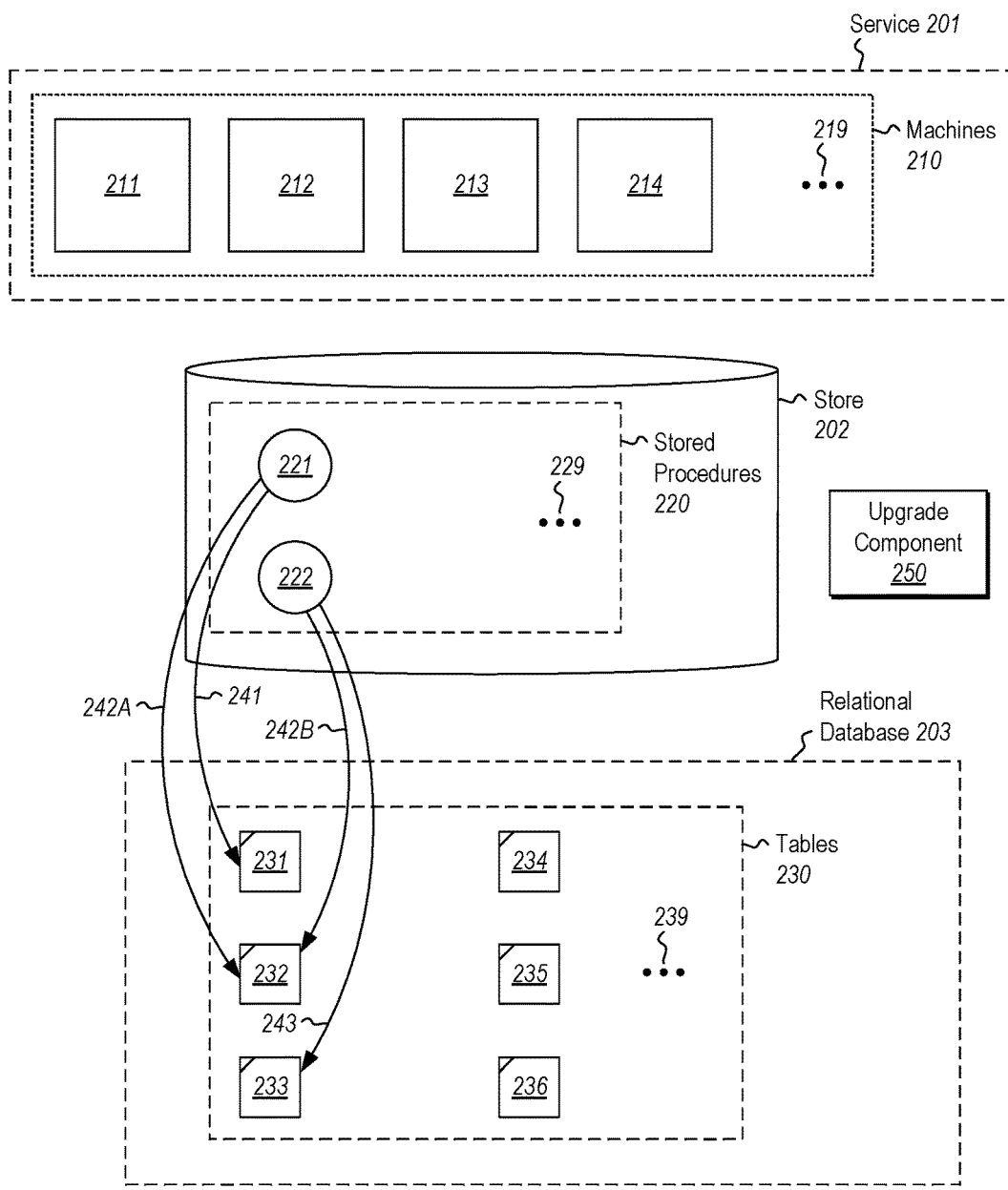
FIG. 4A shows a subsequent state of the architecture of FIG. 2 in which new tables are added to the relational database.
Figure 4B:
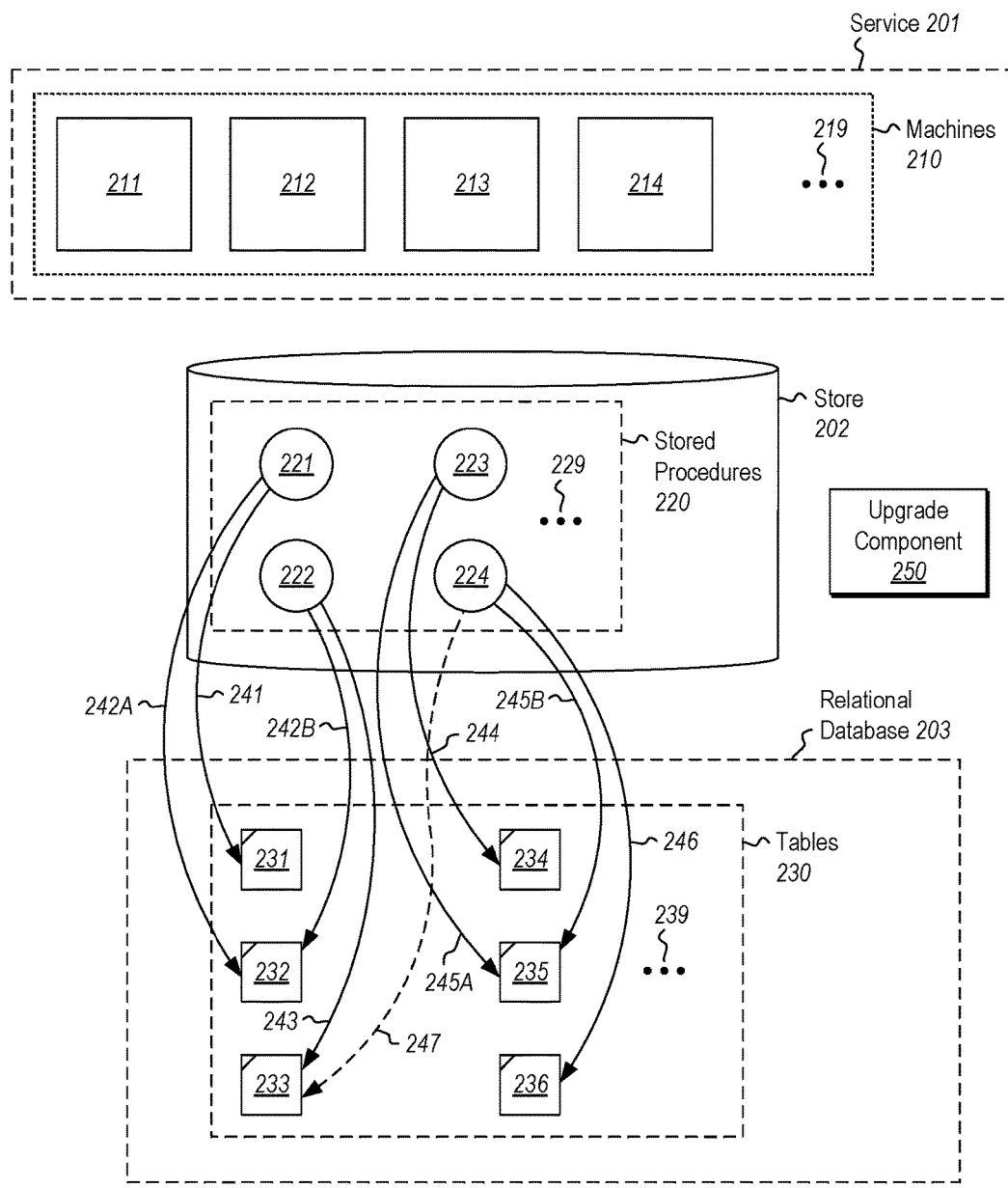
FIG. 4B shows a subsequent state of the architecture of FIG. 2 in which new tables are added to the relational database, and in which new stored procedures are added to the stored procedures store.

First, the service upgrade component adds a new set of one or more tables to the relational database (act 301). For instance, FIG. 4A represents an architecture 400A that is a subsequent state of the architecture 200 of FIG. 2. FIG. 2 shows an example original state in which there are three tables 231, 232 and 233. However, FIG. 4A shows that three additional tables 234, 235 and 236 have been added. Note that the addition of these tables 234, 235 and 236 does require stoppage in operation of the machines 210 since the machine work via the stored procedures 221 and 222, which do not perform data operations on the new tables 234, 235 and 236.

Also, new stored procedures are added to the stored procedures store (act 302). For instance, comparing FIGS. 4A and 4B, new stored procedures 223 and 224 are added to the stored procedures store 240. The new stored procedures 223 and 224 perform data operations on the new tables 234 through 236. For instance, stored procedure 223 has a reference 244 to table 234 and a reference 245A to table 235. Also in the example, stored procedure 224 has a reference 245B to the table 235 and a reference 246 to the table 236.

The new stored procedures 223 and 224 operate on only the new tables 234 through 236. This has an advantage in that once the service is entirely upgraded, if the new tables 234 through 236 are replacements of the old tables 231 through 233, then the old tables may be removed. However, this manner of upgrading is not required. In some embodiments, the new stored procedures 223 and 224 may include references to the old tables. For instance, as shown by dashed line 247, the new stored procedure 224 might have a reference 247 to an old table 233.

Although the adding of the new stored procedures (of FIG. 4B) is described after describing the adding of the new tables (of FIG. 4A), the acts 301 and 302 are shown in parallel in FIG. 3. Since no machines are yet configured to interact with the new stored procedures 233 and 234, there is no temporal dependency on which is added first, and in fact, they may both be added simultaneously. In any case, in the case of FIG. 4B, the relational database 203 itself and the stored procedure store 202 has been upgrade, leaving only the service 201 itself to be upgraded (act 303). Since the machines 211 through 214 of the service 201 may continue to interact with the relational database 203 via the old stored procedures 221 and 223, the upgrade of the machines 211 through 214 may occur in an orderly fashion, always leaving some available to respond to incoming service calls.

Figure 4C:
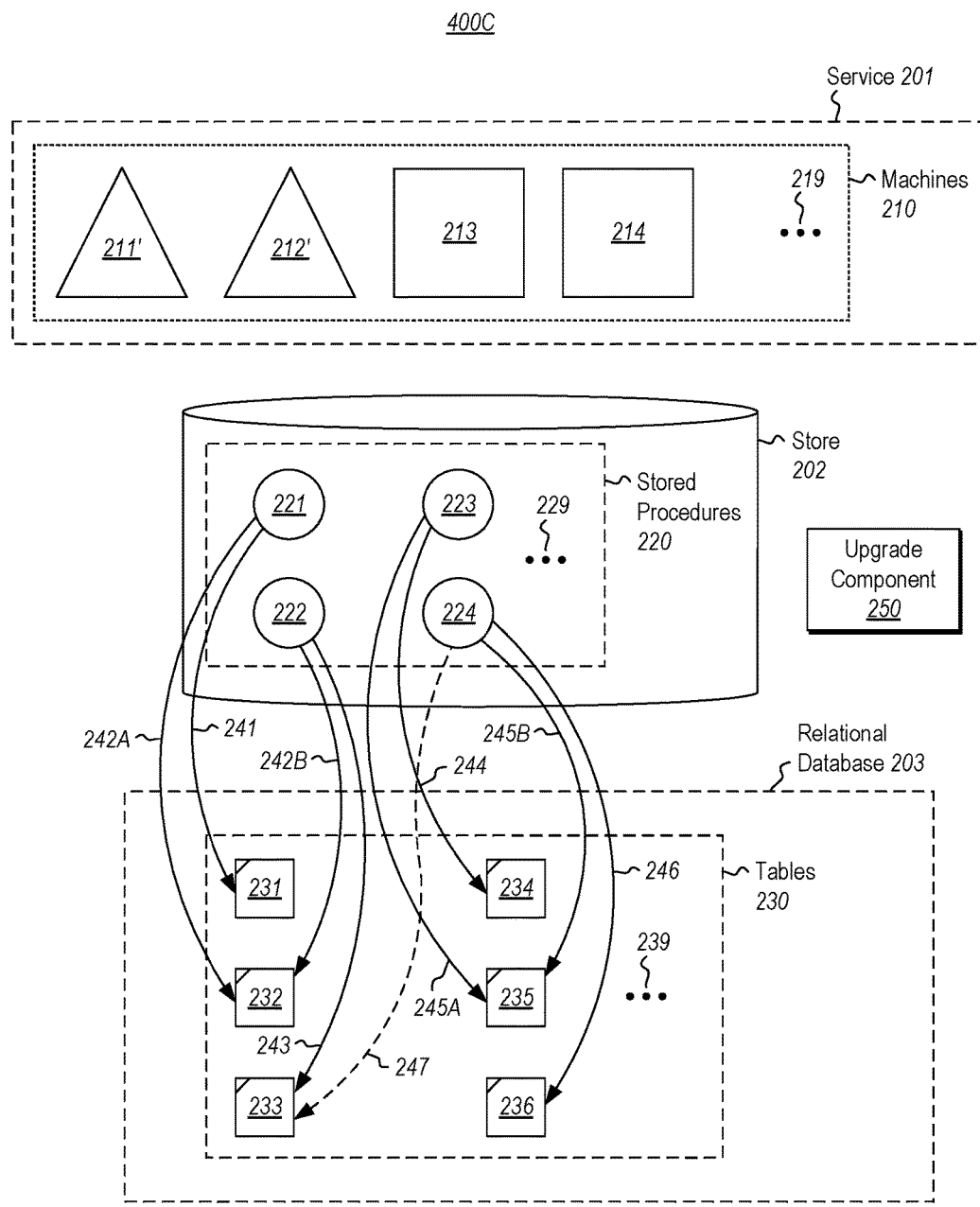
FIG. 4C shows a subsequent state of the architecture of FIG. 4B in which some of the machines of the service have been upgrade.

For instance, in the subsequent state 400C of FIG. 4C, half of the machines 211 through 214 (namely, machines 211 and 212) have been upgraded (to form machines 211' and 212') so as to interface with the relational database 203 via the new stored procedures 223 and 224. This upgrading is represented by the machines 211' and 212' now abstractly being represented as a triangle. The as yet not upgraded machines 213 and 214 may nonetheless continue to operate with the relational database 203 via the old stored procedures 221 and 222. Machines 213 and 214 that have not yet been upgraded may interface with the relational database using the old stored procedures 221 and 222. On the other hand, machines 211' and 212' that have been upgraded may interface with the database using the new stored procedures.

Figure 4D:
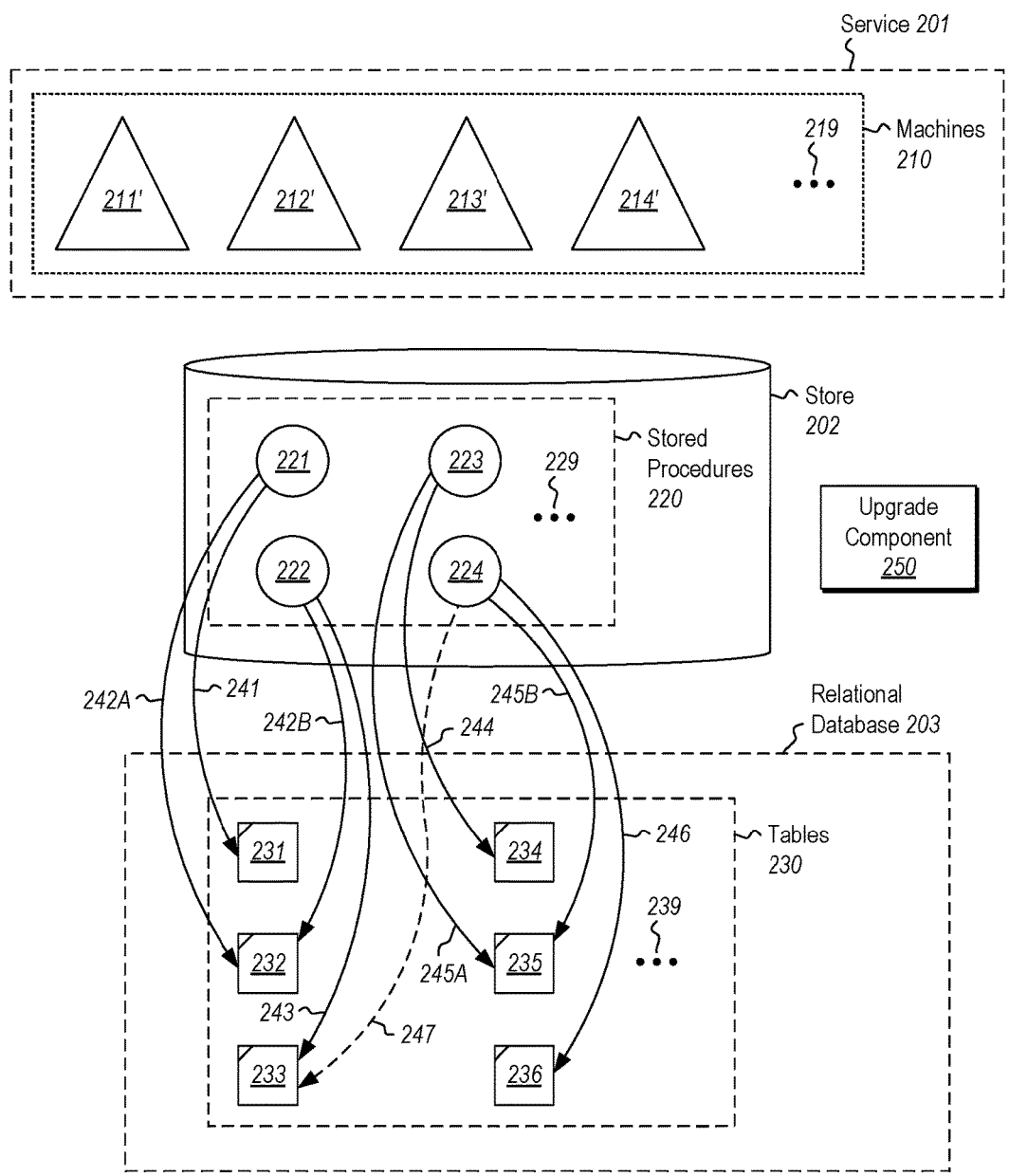
FIG. 4D shows a subsequent state of the architecture of FIG. 4C in which all of the machines of the service have been upgrade.

FIG. 4D illustrates a subsequent state 400D in which all of the machine have now been upgraded to interface with the relational database via the new stored procedures 223 and 224. Accordingly, machines 213 and 214 are also now represented as triangles as machines 213' and 214', symbolizing this upgrade.

At this point, potential relational database cleanup may occur (act 304). Such cleanup is optional, but may involve removal of tables that are no longer in use. For instance, in FIG. 4D, assuming that reference 247 does not exist, tables 231 through 233 may be removed from the relational database 203. If reference 247 does exist, then tables 231 and 232 may be removed from the relational database 203. Furthermore, once the upgrade is entirely complete, the old stored procedures 221 and 222 may be removed for the stored procedure store 202.

However, the principles described herein may also support versioning. For instance, the state of FIG. 4C may continue for some time, with machines 211 and 212 supporting a subsequent version of the service, and machines 213 and 214 supporting a prior version of the service. If method 300 (acts 301, 302 and 303) were performed again, we might find, for example, that machines 213 and 214 support a first version of the service, machine 212 supports a second version of the service, and machine 211 supports a latest version of the service.

Accordingly, the principles described herein provide an efficient mechanism for upgrading a service that relies on an underlying relational database, without stopping the service. Thus, seamless service upgrade is achieved, while the service itself remains highly available. This may be particularly advantageous for services that are to be highly available, such as those services relied upon as having low latency, or those functions that are absolutely mission critical and urgent.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   one or more processors; and
   one or more computer-readable storage media having thereon computer-executable instructions that are executable by the one or more processors of the system to cause the system to upgrade a service associated with a plurality of machines that perform data operations on a relational database having one or more original tables via one or more original stored procedures without service downtime, the computer-executable instructions further including instructions to cause the system to perform the following:

add one or more new tables to the relational database to create an upgraded relational database having the one or more original tables and the one or more new tables;

add one or more new stored procedures to a stored procedure store having one or more original stored procedures, at least one of the one or more new stored procedures being configured to interact with at least one of the one or more new tables, the at least one new stored procedure referencing parameters of the at least one new table, wherein at least one of the one or more new stored procedures is configured to interact with at least one of the one or more original tables; and upgrade the service without service downtime, wherein upgrading the service without service downtime includes:

upgrading one or more machines of the plurality of machines while machines that have not yet been upgraded are interfacing with the upgraded relational database.

2. The system of claim 1, wherein at least one of the one or more upgraded machines is configured to perform data operations on the one or more original tables using one or more original stored procedures after upgrading the service.

3. The system in accordance with claim 2, the at least one non-upgraded machine being configured to perform data operations on the one or more original tables using the one or more original stored procedures until at least one of the one or more machines has been upgraded.

4. The system of claim 1, wherein upgrading the one or more machines of the plurality of machines includes upgrading the one or more machines such that the one or more upgraded machines are at least configured to perform data operations on the one or more new tables via the one or more new stored procedures.

5. The system of claim 1, the one or more original stored procedures remaining available for use by the plurality of machines at least until each of the plurality of machines has been upgraded.

6. The system in accordance with claim 1, wherein the upgrade of the service occurs without changing any parameters of one or more original stored procedures.

7. The system of claim 1, wherein the one or more upgraded machines are configured to perform operations on the one or more original tables via the one or more original stored procedures and the one or more new tables via the one or more new stored procedures.

8. A method, implemented at a computer system including one or more processors, for upgrading a service associated with a plurality of machines that perform data operations on a relational database having one or more original tables via one or more original stored procedures without service downtime, the method comprising:

adding one or more new tables to the relational database to create an upgraded relational database having the one or more original tables and the one or more new tables;

adding one or more new stored procedures to a stored procedure store having one or more original stored procedures, at least one of the one or more new stored procedures being configured to interact with at least one of the one or more new tables, the at least one new stored procedure referencing parameters of the at least one new table, wherein at least one of the one or more new stored procedures is configured to interact with at least one of the one or more original tables; and upgrading the service without service downtime, wherein upgrading the service without service downtime includes:

upgrading one or more machines of the plurality of machines while machines that have not yet been upgraded are interfacing with the upgraded relational database.

9. The method of claim 8, wherein upgrading the one or more machines of the plurality of machines includes upgrading the one or more machines such that the one or more upgraded machines are at least configured to perform data operations on the one or more new tables via the one or more new stored procedures.

10. The method of claim 8, wherein at least one of the one or more upgraded machines is configured to perform data operations on the one or more original tables using the one or more original stored procedures after upgrading the service.

11. The method of claim 10, the at least one non-upgraded machine being configured to perform data operations on the one or more original tables using the one or more original stored procedures until at least one of the one or more machines has been upgraded.

12. The method of claim 8, the one or more original stored procedures remaining available for use by the plurality of machines at least until each of the plurality of machines has been upgraded.

13. The method of claim 8, the upgrade of the service occurs without changing any parameters of the one or more original stored procedures.

14. The method of claim 8, wherein the one or more upgraded machines are configured to perform operations on the one or more original tables via the one or more original stored procedures and the one or more new tables via the one or more new stored procedures.

15. A computer program product comprising one or more computer-readable storage media having thereon computer-executable instructions that are structured such that, when executed by one or more processors of a computing system, cause the computing system to upgrade a service associated with a plurality of machines that perform data operations on a relational database having one or more original tables via one or more original stored procedures without service downtime, the computer-executable instructions further including instructions to cause the computing system to perform the following:

add one or more new tables to the relational database to create an upgraded relational database having the one or more original tables and the one or more new tables;

add one or more new stored procedures to a stored procedure store having one or more original stored procedures, at least one of the one or more new stored procedures being configured to interact with at least one of the one or more new tables, the at least one new stored procedure referencing parameters of the at least one new table, wherein at least one of the one or more new stored procedures is configured to interact with at least one of the one or more original tables; and upgrade the service without service downtime, wherein upgrading the service without service downtime includes:

upgrading one or more machines of the plurality of machines while machines that have not yet been upgraded are interfacing with the upgraded relational database.

16. The computer program product of claim 15, wherein the one or more upgraded machines are configured to perform operations on the one or more original tables via the one or more original stored procedures and the one or more new tables via the one or more new stored procedures.

17. The computer program product of claim 15, wherein at least one of the one or more upgraded machines is configured to perform data operations on the one or more original tables using one or more original stored procedures after upgrading the service.

\* \* \* \* \*